(12) United States Patent
Gurupackiam et al.

(10) Patent No.: US 11,796,104 B2
(45) Date of Patent: Oct. 24, 2023

(54) QUICK CONNECTOR STRUCTURE FOR AUTOMOBILES

(71) Applicants: Hyundai Motor Company, Seoul (KR); Kia Motors Corporation, Seoul (KR)

(72) Inventors: Lakshmanaraj Gurupackiam, Chennai (IN); Raghavendra Prasanna Venkatesan, Hosur (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 957 days.

(21) Appl. No.: 16/688,971

(22) Filed: Nov. 19, 2019

(65) Prior Publication Data
US 2021/0102651 A1 Apr. 8, 2021

(30) Foreign Application Priority Data

Oct. 7, 2019 (IN) .............................. 201911040539

(51) Int. Cl.
| | |
|---|---|
| *F16L 37/20* | (2006.01) |
| *B60K 15/03* | (2006.01) |
| *B60K 15/01* | (2006.01) |
| *F02M 37/00* | (2006.01) |
| *F16L 37/084* | (2006.01) |
| *F16L 37/56* | (2006.01) |

(Continued)

(52) U.S. Cl.
CPC .............. *F16L 37/20* (2013.01); *B60K 15/01* (2013.01); *B60K 15/03006* (2013.01); *F02M 37/0017* (2013.01); *F16L 37/0842* (2013.01); *F16L 37/105* (2013.01); *F16L 37/26* (2013.01); *F16L 37/56* (2013.01); *F16L 39/00* (2013.01); *F16L 39/02* (2013.01); *F16L 47/04* (2013.01); *F16L 47/12* (2013.01)

(58) Field of Classification Search
CPC . F16L 37/56; F16L 3/237; F16L 39/02; F16L 3/2235; F16L 47/12; F16L 47/041; F16L 37/26; F16L 37/20; F16L 37/12; F16L 37/1205; F16L 37/12035; F16L 39/00; B60K 15/01; F02M 37/0017
See application file for complete search history.

(56) References Cited

U.S. PATENT DOCUMENTS

| | | | |
|---|---|---|---|
| 8,430,365 B2* | 4/2013 | Benoit ................... | F16L 5/027 248/74.1 |
| 10,151,409 B2* | 12/2018 | Johnson ................. | F16L 37/08 |

(Continued)

*Primary Examiner* — Atif H Chaudry
(74) *Attorney, Agent, or Firm* — MORGAN, LEWIS & BOCKIUS LLP

(57) ABSTRACT

A combined quick connector structure for fuel feed and return system may include a cover assembly; a lever mechanism along the inside walls of the fuel feed and fuel return openings of the cover assembly; a pawl and ratchet mechanism on either side of the cover assembly; a rib on either side of a connector assembly; the connector assembly with retainer elements for engine feed and engine return lines and fuel feed and return lines; actuator pads provided on the external and internal circumference of the openings of connector assembly; a locking mechanism on the inside circumference of the retainer elements for the fuel feed line and fuel return line; and a lever mechanism configured for hinging the cover assembly together with the connector assembly.

17 Claims, 11 Drawing Sheets

(51) Int. Cl.
*F16L 37/10* (2006.01)
*F16L 39/00* (2006.01)
*F16L 39/02* (2006.01)
*F16L 47/12* (2006.01)
*F16L 37/26* (2006.01)
*F16L 47/04* (2006.01)

(56) References Cited

U.S. PATENT DOCUMENTS

| | | | |
|---|---|---|---|
| 10,164,373 B1* | 12/2018 | Cheon | H01R 13/005 |
| 2011/0210541 A1* | 9/2011 | Lewis | A61B 5/022 |
| | | | 285/317 |
| 2016/0146382 A1* | 5/2016 | Weber | F16L 37/096 |
| | | | 285/305 |
| 2017/0356582 A1* | 12/2017 | Pappalardo | B05C 17/00506 |
| 2019/0162345 A1* | 5/2019 | Lee | F16L 37/56 |

* cited by examiner

QUICK CONNECTOR STRUCTURE FOR AUTOMOBILES

CROSS REFERENCE TO RELATED APPLICATION

The present application claims the benefit of priority to Indian Patent Application No. 201911040539 filed Oct. 7, 2019, the entire contents of which are incorporated herein for all purposes by this reference.

BACKGROUND OF THE INVENTION

Field of the Invention

The present invention relates to a quick connector or quick connector structure for vehicles. More particularly, the present invention relates to a combined quick connector structure for fuel feed and return system of vehicle engines.

Description of Related Art

Quick connectors are widely used for connecting tubes of automotive fuel feed and return systems with the vehicle engine. Conventionally, a quick connector may include a housing unit and a retainer element. The housing unit has a front and rear end. The front end portion has a tubular extension means which may be inserted into the vehicle engine and locked in position by conventional means. The rear end portion may include the retainer element which connects the quick connector housing with the fuel feed line or fuel return line, as the case may be.

The retainer element may include of actuator and lock pads. These types of quick connectors securely lock the fuel feed or fuel return line by simple operations without using any fastening means. The locking of the retainer element and the fuel feed or return line is achieved by the actuator and locking pads. Unlocking involves manual force whereby the actuator pads are pushed inwards, moving the lock pads away from the locked position and facilitating easy pull-back of the fuel feed or return line from the quick connector housing.

The fuel feed and return outlets are usually adjacently located on a vehicle engine. Conventionally, the fuel supply and fuel return lines are connected to the vehicle engine via separate housing units. During engine repair or maintenance, the fuel supply and return lines are disconnected and then reconnected after the repair or maintenance task is completed. There are often instances where the fuel supply and return lines are interchanged leading to potential harmful effects for the vehicle, such as, engine misfire, engine stalling, decreased power and fuel leaks. Such effects are undesirable as not only damage the vehicle but also pose a serious risk to the occupants of a vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a combined quick connector structure for fuel feed and return system of vehicle engines to overcome the disadvantages of the related art.

In an exemplary embodiment of the present invention, the present invention may include of combined quick connector structure for fuel feed and return system including a cover assembly and a connector assembly.

In another exemplary embodiment of the present invention, the present invention may include a cover assembly which has an opening each for fuel feed and return system.

In another exemplary embodiment of the present invention, the present invention may include a cover assembly with an opening each for fuel feed and return, whereby a lever mechanism is provided along the inside walls of the fuel feed and fuel return openings of the cover assembly.

In another exemplary embodiment of the present invention, the present invention may include a cover assembly with an opening each for fuel feed and return, whereby the lever mechanism provided along the inside walls of the fuel feed and fuel return openings of the cover assembly can move in an upward and downward direction thereof.

In another exemplary embodiment of the present invention, the present invention may include a cover assembly with a pawl and ratchet mechanism on either side of the cover assembly.

In another exemplary embodiment of the present invention, the present invention may include a quick connector with a rib such that the lever of the pawl and ratchet mechanism gets locked in the rib as the cover assembly is being moved in an upward direction thereof.

In another exemplary embodiment of the present invention, the present invention may include a cover assembly which has an opening each for fuel feed and fuel return, a lever mechanism along the inside walls of the fuel feed and fuel return openings of the cover assembly, such lever mechanism configured for moving in the upward and downward direction thereof, a pawl and ratchet mechanism on either side of the cover assembly, and a rib of the quick connector such that the lever of the pawl and ratchet mechanism gets locked in the rib as the cover assembly is being moved in an upward direction thereof.

In another exemplary embodiment of the present invention, the present invention may include a connector assembly with retainer elements in the rear end portion for a fuel feed line and fuel return line and tubular extensions in the front end, which may be inserted into a vehicle engine.

In another exemplary embodiment of the present invention, the present invention may include a connector assembly with a first retainer element for a fuel feed line and a second retainer element for a fuel return line with actuator pads provided on the external and internal circumference of the retainer element of the connector assembly.

In another exemplary embodiment of the present invention, the present invention may include a connector assembly with retainer elements for a fuel feed line and fuel return line and actuator pads provided on the external and internal circumference of the retainer elements of the connector assembly on either side the assembly, such actuator pads configured for pushed in.

In another exemplary embodiment of the present invention, the present invention may include a connector assembly whereby a locking mechanism is provided on the inside circumference of the retainer elements for a fuel feed line and fuel return line.

In another exemplary embodiment of the present invention, the present invention may include a combined quick connector structure for fuel feed and return system including a cover assembly and a connector assembly, whereby the cover assembly has an opening each for fuel feed and fuel return, a mechanism along the inside walls of the fuel feed and fuel return openings of the cover assembly, such lever mechanism configured for moving in the upward and downward direction thereof, a pawl and ratchet mechanism on either side of the cover assembly, a rib of the quick connector such that the lever of the pawl and ratchet mechanism gets locked in the rib as the cover assembly is being moved in an upward direction thereof, a connector assembly with retainer elements for a fuel feed line and fuel return line, actuator pads provided on the external and internal circumference of the openings of connector assembly, such actuator pads configured for being pushed in, a locking mechanism on the inside circumference of the retainer elements for the fuel feed line and fuel return line, and wherein, the lever mechanism of the covering assembly is hinged together with the connector assembly.

It is to be understood that both the foregoing general description and the following detailed description of the present invention are exemplary and explanatory and are intended to provide further explanation of the invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
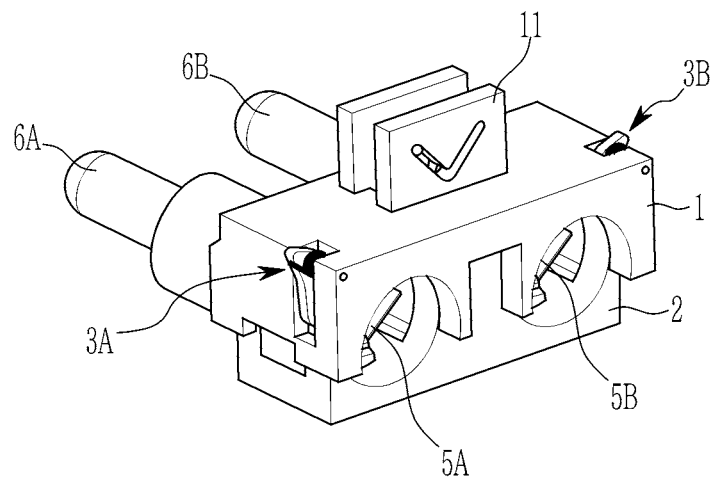
FIG. 1 is a pictorial representation of the combined quick connector assembly of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present inventions, examples of which are illustrated in the accompanying drawings and described below. While the present inventions will be described in conjunction with exemplary embodiments of the present invention, it will be understood that the present description is not intended to limit the present inventions to those exemplary embodiments. On the other hand, the present inventions is/are intended to cover not only the exemplary embodiments of the present invention, but also various alternatives, modifications, equivalents and other embodiments, which may be included within the spirit and scope of the present invention as defined by the appended claims.

Hereinafter, the present invention will be described in detail with reference to the accompanying drawings.

FIG. 1 is a pictorial representation of the combined quick connector assembly of the present invention.

As shown in FIG. 1, the present invention includes of the covering assembly 1 and the connector assembly 2.

Figure 2:
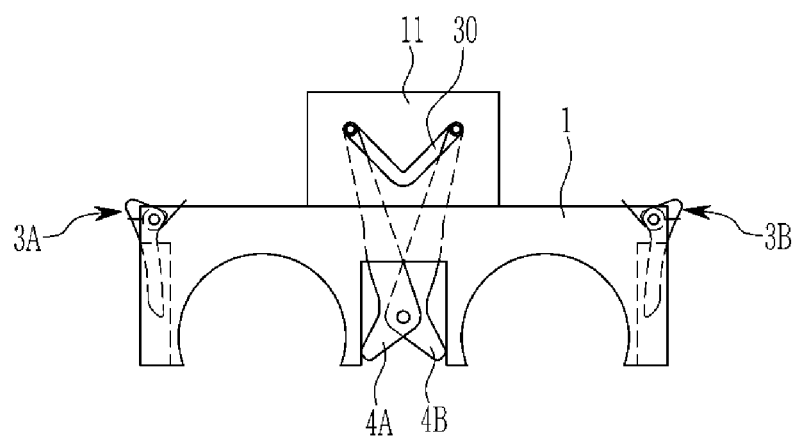
FIG. 2 is a pictorial representation of the cover assembly forming portion of the combined quick connector assembly of the present invention.

FIG. 2 is a pictorial representation of the cover assembly forming portion of the combined quick connector assembly of the present invention.

As shown in FIG. 2, the cover assembly 1 includes a pawl and ratchet mechanism 3A, 3B on either side of the cover assembly 1. The cover assembly 1 also includes a lever mechanism having two levers 4A, 4B.

Figure 3:
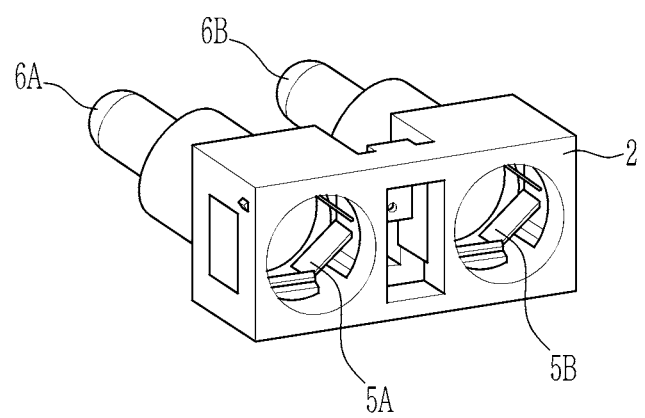
FIG. 3 is a pictorial representation of the connector structure forming portion of the combined quick connector assembly of the present invention.

FIG. 3 is a pictorial representation of the connector structure forming portion of the combined quick connector assembly of the present invention.

As shown in FIG. 3, the connector assembly 2 includes of two retainer elements 5A, 5B in the rear end. At the front end portion of the connector assembly, tubular extensions 6A, 6B are provided which may be inserted to the fuel lines.

Figure 4A:
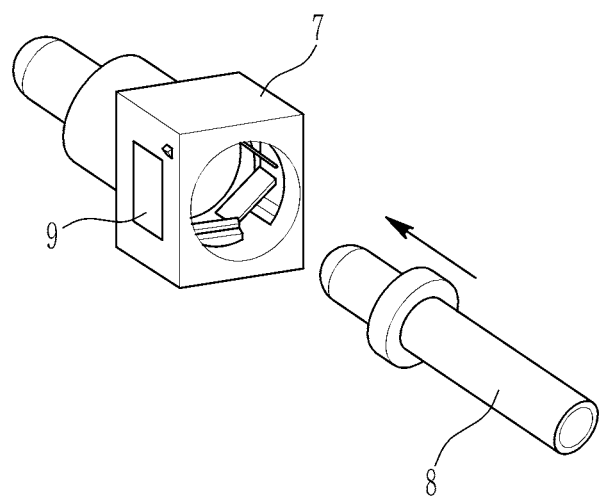
FIG. 4A, FIG. 4B and FIG. 4C is pictorial representation of a quick connector assembly
Figure 4B:
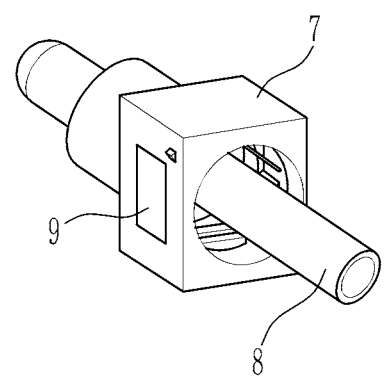
Figure 4C:
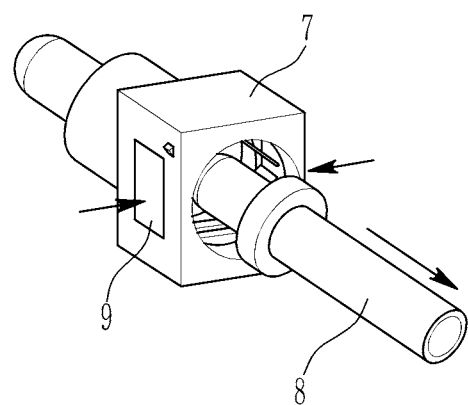

FIG. 4A, FIG. 4B and FIG. 4C is pictorial representation of a quick connector assembly.

As shown in the figures, conventionally, the fuel pipe inlet or outlet 8 is pushed inside the quick connector 7. Once inside, the locking mechanism of the quick connector 7 locks the pipe in position. The quick connector 7 is provided with actuator pads 9, which may be manually pushed to unlock the pipe.

Figure 5A:
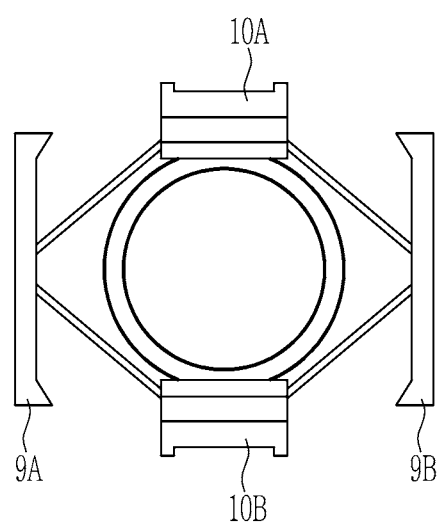
FIG. 5A is a pictorial representation of the Retainer and a portion of the return line of the present invention in the locked state.
Figure 5B:
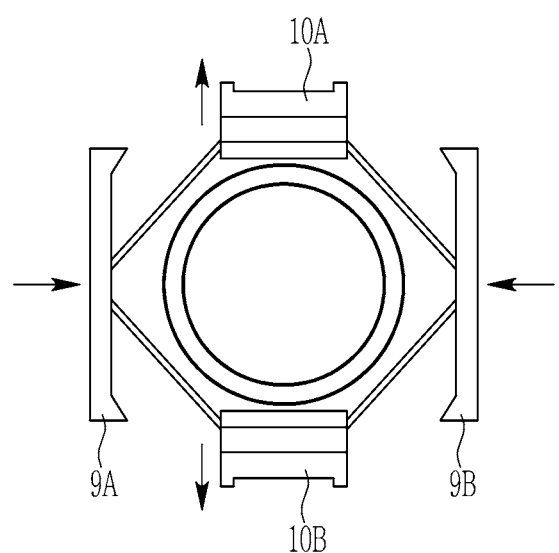
FIG. 5B is a pictorial representation of the Retainer and a portion of the return line of the present invention in the unlocked state.

FIG. 5A is a pictorial representation of the retainer and a portion of the return line of the present invention locked state and FIG. 5B is a pictorial representation of the Retainer and a portion of the return line of the present invention in the unlocked state.

As shown in the figures, in the locked state, the locking pads 10A, 10B hold a pipe insert in position. When both actuator pads 9A, 9B of the quick connector assembly are pushed, locking pads 10A, 10B move upwards and downwards, respectively, releasing the pipe insert from the locked position.

Figure 6A:
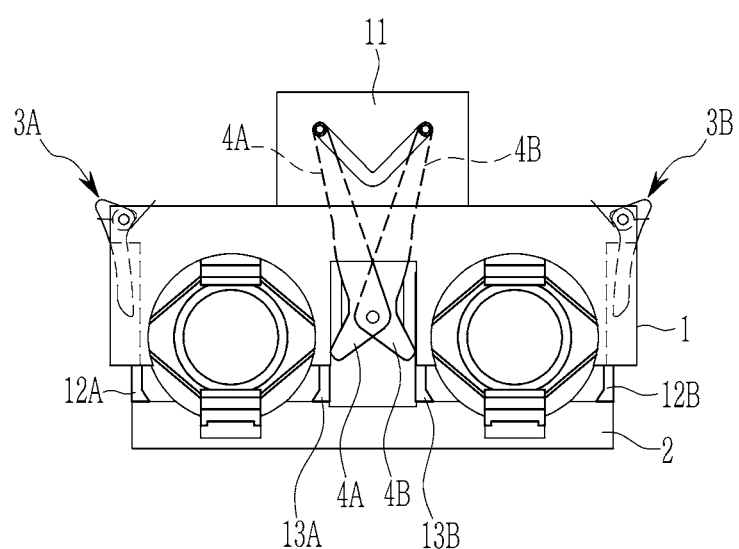
FIG. 6A is a pictorial representation of the combined quick connector assembly of the present invention in the locked state.
Figure 6B:
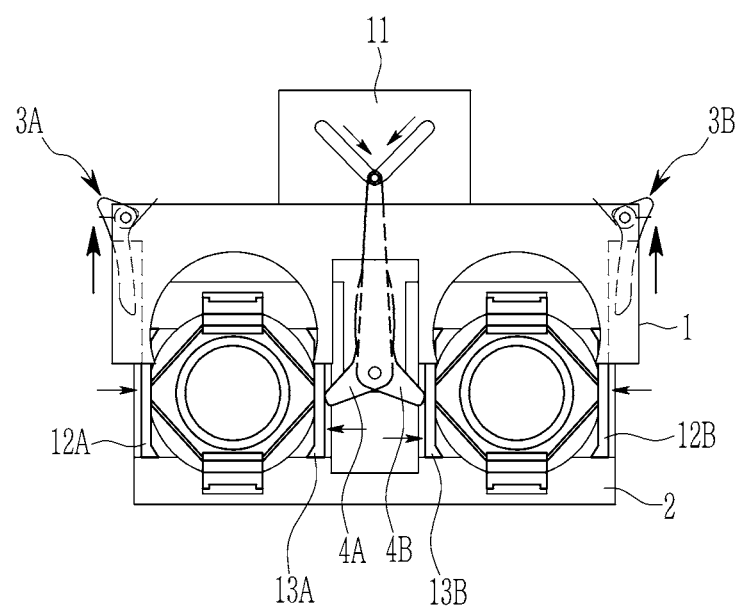
FIG. 6B is a pictorial representation of the combined quick connector assembly of the present invention in the unlocked state.

FIG. 6A is a pictorial representation of the combined quick connector assembly of the present invention in the locked state and FIG. 6B is a pictorial representation of the combined quick connector assembly of the present invention in the unlocked state.

As shown in the figures, the combined quick connector assembly of the present invention in the locked state includes the levers 4A, 4B in the elevated member 11 hinged with the connector assembly 2. The combined quick connector assembly includes actuator pads 12A, 12B on an external circumference and actuator pads 13A, 13B on the inside circumference of the cover assembly. When the cover assembly 1 is lifted, the levers 4A, 4B press the actuator pads 13A, 13B. The cover assembly 1 is locked in position by the pawl and ratchet mechanism 3A, 3B elastically biased by a spring 25 mounted on the cover assembly 1. In the locked position of the cover assembly 1, the levers 4A, 4B are in the downward position 14. The actuator pads 12A, 12B may be manually pushed to release the pipe insert.

In an exemplary embodiment of the present invention, the elevated member 11 includes a guide groove 30 into which an end of the levers 4A and 4B is slidably engaged.

Figure 7:
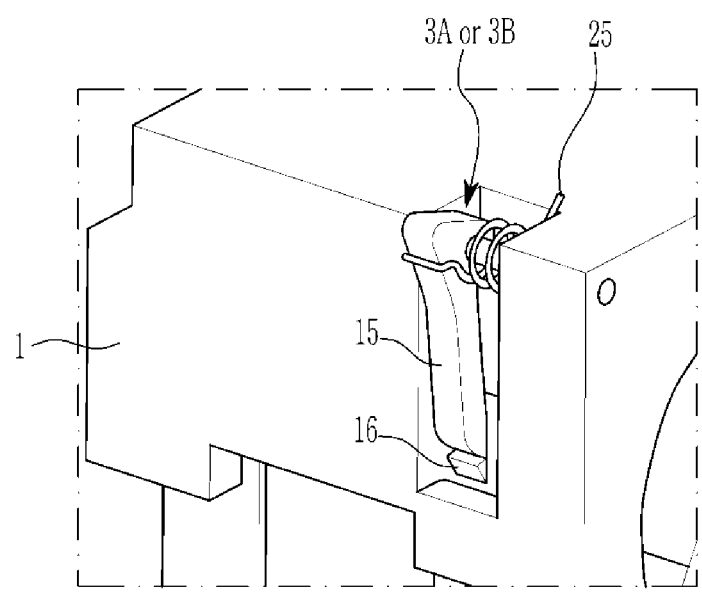
FIG. 7 is a pictorial representation of the pawl and ratchet mechanism of the cover assembly of the present invention.

FIG. 7 is a pictorial representation of the pawl and ratchet mechanism of the cover assembly of the present invention. The cover assembly 1 is provided with a rib 16 while the pawl and ratchet mechanism 3 includes a lever 15. When the cover assembly 1 is pulled up, the lever 15 gets locked in position at the rib 16, restricting the movement of the cover assembly.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A combined quick connector structure for a fuel feed system and a fuel return system, the combined quick connector structure comprising:
    a cover assembly and a connector assembly connected to the cover assembly,
    wherein the connector assembly includes actuator pads mounted on external and internal circumferences of an opening of the connector assembly, and
    wherein the cover assembly includes a pawl and ratchet mechanism on either side of the cover assembly.

2. The combined quick connector structure of claim 1, wherein the opening of the connector assembly includes a first opening and a second opening, and
    wherein the cover assembly includes the first opening for the fuel feed system and the second opening for the fuel return system.

3. The combined quick connector structure of claim 2, wherein a lever mechanism is provided along internal walls of the first opening and the second opening of the cover assembly.

4. The combined quick connector structure of claim 3, wherein the lever mechanism provided along the internal walls of the first opening and the second opening of the cover assembly is configured to move in a predetermined direction of the combined quick connector structure.

5. The combined quick connector structure of claim 1, wherein the connector assembly includes a rib, and wherein a lever of the pawl and ratchet mechanism is locked in the rib when the cover assembly is moved into an unlocked position.

6. The combined quick connector structure of claim 1, wherein the connector assembly includes a rib, on either side of the connector assembly.

7. The combined quick connector structure of claim 6, wherein a lever of the pawl and ratchet mechanism is locked in the rib when the cover assembly is moved into an unlocked position.

8. The combined quick connector structure of claim 6, wherein the opening of the connector assembly includes a first opening and a second opening, and
    wherein the cover assembly further includes the first opening for the fuel feed system and the second opening for the fuel return system, a lever mechanism along internal walls of the first opening and the second opening of the cover assembly,
    wherein the lever mechanism is configured for moving in a predetermined direction of the combined quick connector structure,
    wherein the pawl and ratchet mechanism is mounted on either side of the cover assembly, and
    wherein a lever of the pawl and ratchet mechanism is locked in the rib when the cover assembly is moved into an unlocked position.

9. The combined quick connector structure of claim 1, wherein the connector assembly includes:
    a first retainer element for a fuel feed line and a second retainer element for a fuel return line; and
    tubular extensions for inserting into the fuel feed line and the fuel return line.

10. The combined quick connector structure of claim 1, wherein a locking mechanism is provided on an internal circumference of a first retainer element for a fuel feed line and a second retainer element for a fuel return line.

11. The combined quick connector structure of claim 1, wherein the cover assembly and the connector assembly are hinged with a lever mechanism.

12. The combined quick connector structure of claim 1, wherein the opening of the connector assembly includes a first opening and a second opening, and
    wherein the combined quick connector structure further includes:
    the cover assembly with the first opening for the fuel feed system and the second opening for the fuel return system;
    a lever mechanism along internal walls of the first and second openings of the cover assembly, the lever mechanism configured for moving in a predetermined direction of the combined quick connector structure;
    the pawl and ratchet mechanism pivotally mounted on either side of the cover assembly;
    a rib provided on either side of the connector assembly, wherein a lever of the pawl and ratchet mechanism is locked in the rib when the cover assembly is moved in an unlocked position;
    a first retainer element for a fuel feed line and a second retainer element for a fuel return line and tubular extensions for inserting into the fuel feed line and the fuel return line;
    actuator pads provided on external and internal circumference of the first and second openings of the connector assembly, the actuator pads configured for being selectively pushed in; and a locking mechanism on internal circumference of the first and second retainer elements for the fuel feed line and the fuel return line, wherein the lever mechanism is configured for hinging the cover assembly with the connector assembly.

13. The combined quick connector structure of claim 12, wherein the actuator pads include a first actuator pad and a second actuator pad, wherein the lever mechanism includes a first lever and a second lever pivotally connected to the first lever, wherein first ends of the first lever and the second lever are engaged with the first and second actuator pads, and wherein second ends of the first lever and the second lever are slidably engaged with a groove of an elevation member.

14. The combined quick connector structure of claim 13, wherein the connector assembly includes a first retainer element for the fuel feed line and a second retainer element for an engine feed and return line, wherein the first retainer element, a first locking pad, and the first actuator pad are engaged to the first end of the first lever, and wherein the second retainer element, a second locking pad, and the second actuator pad are engaged to the first end of the second lever.

15. A combined quick connector structure for a fuel feed system and a fuel return system, the combined quick connector structure comprising:

a cover assembly and a connector assembly connected to the cover assembly, wherein the connector assembly includes actuator pads mounted on external and internal circumference of first and second openings of the connector assembly, wherein the actuator pads include a first actuator pad and a second actuator pad, wherein a lever mechanism includes a first lever and a second lever pivotally connected to the first lever and riveted to the connector assembly, wherein first ends of the first lever and the second lever are engaged with the first and second actuator pads, and wherein second ends of the first lever and the second lever are slidably engaged with a groove of an elevation member.

16. The combined quick connector structure of claim 15, wherein the connector assembly includes a first retainer element for a fuel feed line and a second retainer element for a fuel return line, wherein the first retainer element and a first set of locking pads controlled by the first actuator pad and a third actuator pad are engaged to and actuated by the first end of the first lever, and wherein the second retainer element and a second set of locking pads controlled by the second actuator pad and a fourth actuator pad are engaged to and actuated by the first end of the second lever.

17. The combined quick connector structure of claim 16, wherein the third actuator pad mounted on a first external circumference of the first opening is pressable and engaged to the first retainer element, and wherein the fourth actuator pad mounted on a second external circumference of the second opening is pressable and engaged to the second retainer element.

* * * * *